UNITED STATES PATENT OFFICE.

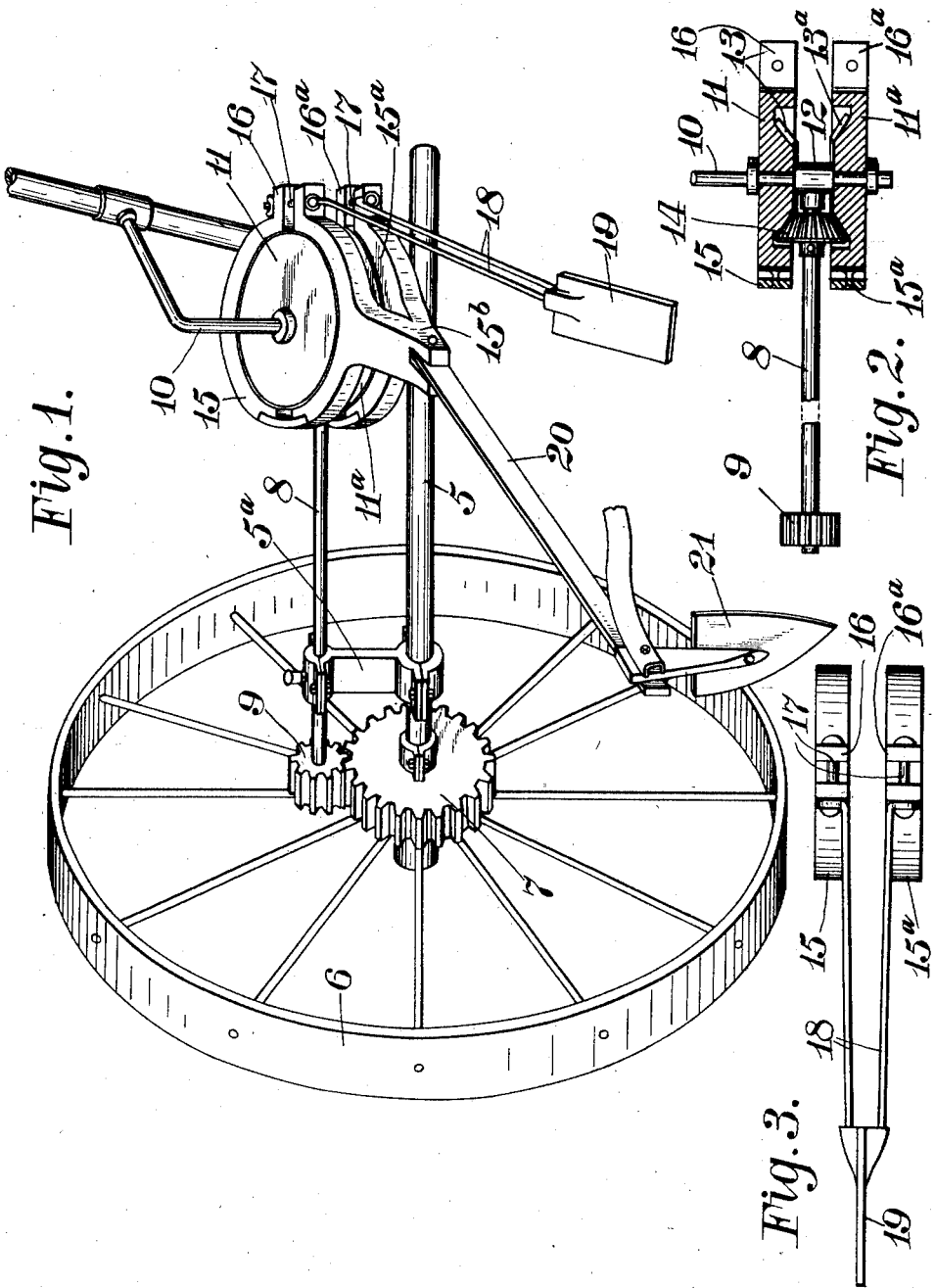

HENRY A. BLAUSER, OF PICKERINGTON, OHIO.

CULTIVATOR.

1,349,657.  Specification of Letters Patent.  Patented Aug. 17, 1920.

Application filed April 14, 1920. Serial No. 373,706.

*To all whom it may concern:*

Be it known that I, HENRY A. BLAUSER, a citizen of the United States, residing at Pickerington, in the county of Fairfield and State of Ohio, have invented a certain new and useful Improvement in Cultivators, of which the following is a specification.

Rows of corn or other plants requiring cultivation are not uniformly straight and cultivators are not always drawn in a straight line. It is therefore important that the cultivating blade or plow be shifted to the right or left as it is drawn along to conform to deviations from a straight line and prevent the plow from running into the plants and uprooting or injuring them. This work has heretofore been done with the foot at the cost of much exertion on the part of the driver. The object of the present invention is to put this labor upon the animal or upon a tractor.

The invention is embodied in the example herein shown and described, the features of novelty being finally claimed.

In the accompanying drawing—

Figure 1 is a perspective view showing one side of a cultivator equipped with my invention.

Fig. 2 is a detail in vertical section showing the shifting mechanism.

Fig. 3 is a detail of the means for actuating the clutch bands.

In the views 5 designates the main axle of the cultivator and 6 one of the carrying wheels therefor. Connected with the carrying wheel to rotate therewith is a large spur gear 7. The character 8 designates a counter shaft having a pinion 9 driven by the spur gear 7. Said counter shaft is supported by a bracket 5ª fixed on the main axle 5. Supported upon a suitable spindle or journal 10 are a pair of disks 11 and 11ª suitably spaced apart as by a sleeve 12 on the spindle. These disks 11 and 11ª are provided on their opposed faces with beveled gears 13 and 13ª engaged by a beveled gear 14 on the counter shaft 8. Motion of the vehicle turns the disks in opposite directions. The rims of the disks are surrounded by flexible clutch bands 15 and 15ª having a common connection at 15ᵇ. Each of the bands 15 and 15ª has a pair of ears as at 16 and 16ª connected by a bolt 17. Each bolt has connected with it a rod 18 extending to a common foot piece 19 so that when the foot piece is moved in one direction one of the clutch bands is pinched to its disk and when moved in the other direction the other clutch band is pinched to its disk. In the intermediate position neither band is pinched on its disk and both disks turn idly. The foot piece 19 is located within convenient reach of the foot of the driver.

Pivoted in the common connecting piece 16 is the plow beam 20 carrying the cultivating blade or plow 21.

When, in practice, it is desired to move the plow or blade 21 to the right or left the appropriate clutch band is pinched to its disk simply by moving the foot piece in the proper direction.

The forms of the parts can be changed without departing from the gist of the invention as claimed.

What I claim is:

1. In a cultivator, a cultivator blade and its beam, a reversing clutch mechanism for the beam interposed between the beam and a carrying wheel of the cultivator for shifting the blade to the right or the left, and a lever operable by the driver for controlling the operation of said reversing clutch mechanism to shift the blade to the right or left.

2. In a cultivator, means for shifting the cultivator blade beam to the right or the left comprising a pair of rotary disks, means for driving the disks in opposite directions when the cultivator is in motion, clutch bands for said disks, the beam being actuatable by said means, and means for operatively engaging either of said bands with its disk at the will of the driver.

3. In a cultivator, means for shifting the cultivator blade beam to the right or the left comprising a pair of rotary disks, means for gearing said disks to a carrying wheel of the cultivator for driving them in opposite directions, clutch bands operably connected with the blade beam for engaging said disks and means for engaging either of said bands with its disk at the will of the driver.

HENRY A. BLAUSER.